United States Patent [19]
Hawkins

[11] 3,931,956
[45] Jan. 13, 1976

[54] HOIST

[76] Inventor: Wallace H. Hawkins, Rte. 7, Old Buncombe Rd., Greenville, S.C. 29611

[22] Filed: Nov. 21, 1974

[21] Appl. No.: 525,839

Related U.S. Application Data

[63] Continuation of Ser. No. 373,606, June 25, 1973, abandoned.

[52] U.S. Cl. .......................................... 254/8 B
[51] Int. Cl.[2] .......................................... B60P 1/48
[58] Field of Search ....... 280/150 A, 43; 254/139.1, 254/4 R, 4 B, 8 R, 8 B, 124; 61/41 A; 5/83, 87

[56] References Cited

UNITED STATES PATENTS

| | | | |
|---|---|---|---|
| 1,974,463 | 9/1934 | Kintzley | 254/139.1 |
| 2,233,262 | 2/1941 | Jacobson | 280/43 |
| 2,814,394 | 11/1957 | Witcher | 254/8 B |
| 2,922,283 | 1/1960 | Porter | 61/41 A |
| 3,145,857 | 8/1964 | Hayman | 254/4 R |
| 3,540,632 | 11/1970 | Clingan | 280/150 A |
| 3,758,076 | 9/1973 | Tranchero | 254/8 R |

*Primary Examiner*—Al Lawrence Smith
*Assistant Examiner*—Robert C. Watson
*Attorney, Agent, or Firm*—Bailey & Dority

[57] ABSTRACT

A device for lifting and transporting heavy objects on a surface including a hoist which is pivotally secured to a vertical standard that is carried on a base structure. The base structure includes a pair of outwardly extending legs which has primary wheels located adjacent the end thereof for transporting the hoist. A pair of auxiliary wheels are pivotally carried adjacent the primary wheels. The auxiliary wheels can be brought in contact with the surface lifting the primary wheels off the surface adding maneuverability to the hoist. A telescoping vertically adjustable safety standard engages the boom supporting the hoist for locking the boom in a fixed position.

3 Claims, 2 Drawing Figures

HOIST

This application is a continuation of Ser. No. 373,606 filed June 25, 1973, now abandoned.

BACKGROUND OF THE INVENTION

This invention relates to a hoist, and more particularly to a hoist which is readily maneuverable and for a safety standard for a boom supporting the hoist.

Heretofore, hoists such as used for lifting engines of automobiles have been provided with wheels so that a base portion of the hoist can be rolled under the automobile while the boom and hoist extend over the engine. Normally, heavy duty wheels are provided on the outer end of the base member so as to accommodate the load. One problem with such wheels is generally they are only permitted to rotate in one direction. While these type wheels are desirable in that they stabilize the hoist for lifting the engine from an automobile, they are limited in maneuverability.

The boom which supports the hoist on such devices is normally raised and lowered with hydraulic cylinders. These cylinders operate satisfactorily for raising and lowering the boom, however, if the hydraulic line leading to the cylinder bursts or leaks while the hoist is being used to lift a heavy load, such could cause the load to be dropped.

SUMMARY OF THE INVENTION

This invention constructed in accordance with the present invention is for a hoist for lifting and transporting heavy objects on a surface. The hoist includes a substantially vertically extending standard which has a boom extending outwardly therefrom. A lift mechanism is carried on the outer end of the boom. A pair of hydraulically operated cylinders engage the boom for raising and lowering the boom responsive to hydraulic fluid being inserted and removed therefrom. The substantially vertical standard is supported on a base structure which includes a pair of spaced outwardly extending horizontal legs. Pivotal wheels are carried adjacent an inner end of the base structure for aiding in supporting the structure. Positioned on the outer end of the outwardly extending legs are primary wheels which are journalled for rotation about a fixed axis. An auxiliary wheel is carried adjacent each of the primary supporting wheels and is pivotally supported so such can be raised and lowered into contact with the surface for lifting the primary wheels off of the surface. The auxiliary wheels are mounted on a swivel, therefore, when such engage the surface such adds maneuverability to the hoist. This is particularly important when the hoist is being used for lifting engines, such as from diesel trucks. Normally, the hoist is positioned along side of the diesel truck, and in order to disengage the engine from the transmission the hoist has to be shifted laterally prior to raising the engine. When the auxiliary wheels are in engagement with the surface such is readily permitted.

A telescoping vertically adjustable safety standard engages an upper end engaging the boom for aiding in supporting the boom. The safety standard can be locked in a fixed position so that if the hydraulically operated cylinders fail, such will prevent the boom from dropping.

Accordingly, it is an important object of the present invention to provide auxiliary wheels for an apparatus for transporting heavy objects and the like.

Still another important object of the present invention is to provide a pair of auxiliary wheels adjacent primary wheels which can be lowered in contact to the surface on which the hoist is supported for adding maneuverability to the hoist.

Another important object of the present invention is to provide a pair of auxiliary wheels closely adjacent primary transporting wheels which are adapted to be adjusted to lift the primary wheels off a supporting surface for transporting the hoist while maintaining the primary wheels closely adjacent the surface in case such auxiliary wheels fail.

Still another important object of the present invention is to provide a hoist with a telescoping vertically adjustable safety standard which can be locked in position for supporting a boom in the event hydraulic cylinders, which are utilized for raising and lowering the boom fails.

These and other objects and advantages of the invention will become apparent upon reference to the following specification, attendant claims and drawing.

DESCRIPTION OF A PREFERRED EMBODIMENT

Figure 1:
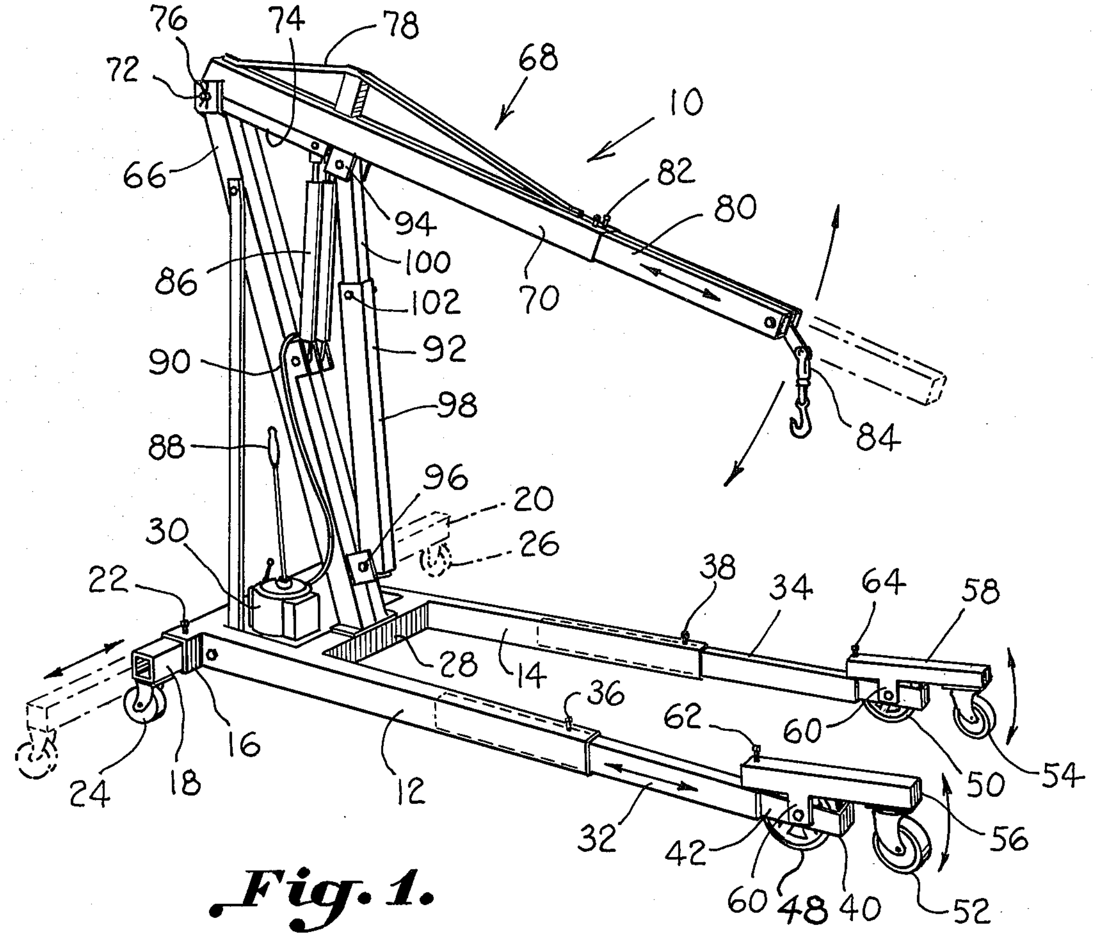
FIG. 1 is a perspective view illustrating a hoist constructed in accordance with the present invention.

Referring in more detail to FIG. 1 of the drawing, there is illustrated an apparatus for lifting and transporting heavy objects generally designated by the reference character 10. The apparatus includes a base structure having a pair of spaced outwardly extending horizontal legs 12 and 14. The legs are constructed of tubular steel and the inner end thereof is welded to a cross tubular member 16. Laterally extending tubular members 18 and 20 extend in the tubular member 16 in telescoping relationship therewith. The lateral position of these tubular members 18 and 20 may be adjusted by sliding such in and out of the tubular member 16 and locking them in position by rotating a bolt 22. The bolts 22 are threaded in the tubular member 16 and abuts against a top portion of the tubular members 18 and 20. Swivel wheels 24 and 26 are carried on the bottom of the tubular members 18 and 20 for supporting the inner end of the base structure. A reinforcing tubular member 28 is welded between the outwardly extending legs 14 and 16. In addition to the reinforcing tubular member 28 suitable bracing (not shown) is provided for supporting a hydraulic pump 30. Outwardly extending tubular extension legs 32 and 34 telescope within the outer ends of legs 12 and 14, respectively. Bolts 36 and 38 extend through threaded holes in the tubular legs 12 and 14 and engage the extension legs 32 and 34, respectively, for locking such relative to the legs 12 and 14.

Primary supporting wheels 48 and 50 are carried within a U-shaped member 40 defined by a pair of spaced arms 42 and 44 which have inner ends thereof welded to the outer end of the extensions 32 and 34.

An axle in the form of a bolt 46 extends between the spaced arms 42 and 44 for rotatably supporting the primary wheels 48 and 50. The primary wheels are large metallic wheels which enables the lifting apparatus 10 to be rolled in a direction perpendicular with the axle 46.

Figure 2:
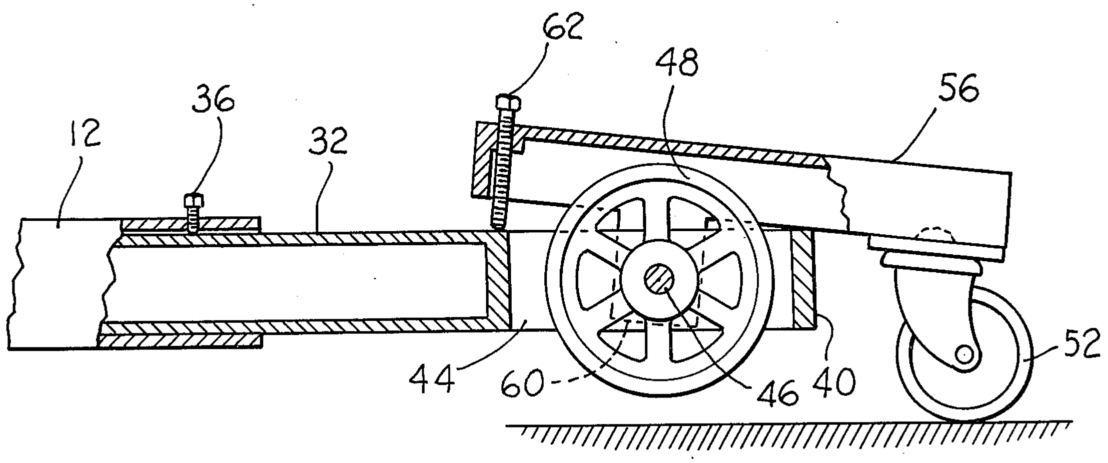
FIG. 2 is an enlarged fragmentary sectional view illustrating an auxiliary wheel utilized for adding maneuverability to the hoist.

Adjustable auxiliary swivel wheels 52 and 54 are carried on the bottom surface of channel members 56 and 58. The channel members 56 and 58 have legs 60 extending downwardly from the spaced sidewalls of the channel members 56 and 58 slightly to the rear of the center thereof. The legs 60 have holes positioned therein through which the axle 46 extends so that the channel members 56 and 58 are permitted to pivot on the axle 46. Threadably extending through an inner end of the channel members 56 and 58 are adjustable means in the form of bolts 62 and 64. These bolts threadably engage an upper surface of the channel members 56 and 58 and the lower end thereof abuts against the upper surface of channel members 32 and 34. By rotating the bolts 62 and 64 in a direction so that the bolts are screwed down in the channel members 56 and 58 such causes the inner ends of the channel members 56 and 58 to rise. It is noted in FIG. 2 that the lower end of the bolts 62 and 64 engage an upper surface adjacent the outer end of the tubular members 32 and 34. When the bolts 62 and 64 are screwed downwardly such causes the channel members 56 and 58 to pivot about the axle 46 bringing the wheels 52 and 54 from a first position wherein they are not in contact with the surface upon which the hoist is being transported to a position wherein the wheels engage the surface lifting the primary wheels 48 and 50 off of the surface. As shown in FIG. 1 the auxiliary wheels 52 and 54 are in the first position where they do not engage the surface and the primary wheels support the outer end of the arms 12 and 14. In FIG. 2 the auxiliary wheels 52 and 54 are adjusted to the second, or lower position wherein they lift the primary wheels 48 and 50 off of the supporting surface. In this second position since the wheels 52 and 54 are swivel wheels the apparatus is more maneuverable. It is also noted that if the auxiliary wheels 52 and 54 fail the front end of the outwardly extending arms 12 and 14 would only drop approximately one inch until the primary wheels 48 and 50 engage the supporting surface. This is an added safety feature for the apparatus.

A substantially vertical standard 66 in the form of a pair of abutting tubular members 66 extend upwardly from the cross-brace 28. A boom 68 constructed of a primary tubular member 70 is pivotally attached by means of a bolt 72 to an upper end of a vertical standard 66. The inner end of the boom 70 has a pair of opposed downwardly extending flanges 74 which have holes (not shown) extending therethrough for accommodating the bolt 72. The bolt 72 is secured by a cotter pin 76. Additional bracing 78 is provided on the upper surface of the primary tubular member 70. An adjustable tubular extension 80 is carried within the outer end of the primary tubular member 70 in a telescoping relationship so that its outward position can be adjusted. The outward position of the tubular member 80 can be fixed by screwing the bolts 82 downward to engage the extension boom 80. The bolts 82 extend through threaded holes in the primary tubular boom member 70 to abut against an upper surface of the extension member 80.

Any suitable conventional hoist designated by the reference character 84 may be carried on the upper end of the extension member 80 for engaging the object to be lifted.

The boom 10 is raised and lowered by means of a pair of hydraulic cylinders 86 which have their lower ends pivotally attached by means of pins to the substantially vertical standard 66. The upper ends of the hydraulic cylinders 86 are pivotally connected by any suitable conventional means to the flanges 74 carried on the bottom of the boom 10. The hydraulic pump 30 has a handle 88 which can be manipulated back and forth to supply hydraulic fluid under pressure through a hose 90 to the cylinders 86. By manipulating the handle 88 such causes the hydraulic cylinders 86 to be extended raising the boom 10.

A safety telescoping standard 92 has an upper end pivotally attached to downwardly extending brackets 94 carried on the bottom of the boom 68. The lower end of the safety telescoping standard 92 is pivotally attached to a bracket 96 carried adjacent the bottom of the substantially vertical standard 66. The safety standard 92 is constructed of a pair of telescoping tubular members 98 and 100. The tubular member 98 is slightly larger in diameter than the tubular member 100 so that the tubular member 100 can slide therein. A bolt 102 extending through the tubular members 98 and 100 is provided for locking the safety standard 92 in a fixed extended position. Vertically spaced holes (not shown) are provided in the tubular member 100 for accommodating the bolt 102 for locking the safety standard 92 in different extended positions.

In summarizing the operation of the hoist, normally the operator rolls the hoist adjacent the hood of the car with the legs 12 and 14 extending under the engine thereof. The bolt 102 forming part of the safety standard 92 is removed so as to permit the tubular member 100 to slide freely within the tubular member 98. The operator then slides the extension portion 80 of the boom outward to a position where the hoist 84 can be coupled by any suitable means to the engine of the automobile. Bolts 82 are screwed downwardly for locking the extension 80 in position. The handle 88 is moved back and forth causing the pump 30 to supply hydraulic fluid under pressure to the cylinders 86 for raising the engine and boom 10 to the desired height. Once the boom has been raised to the desired height the bolt 102 is inserted through the holes in the tubular members 98 and 100 forming a part of the safety standard for locking the boom in a fixed position. The purpose of this is to prevent the boom 10 from falling if the hydraulic cylinders fail.

In order to add maneuverability to the apparatus the adjustable bolts 62 and 64 carried on the channel members 56 and 58 are screwed downwardly bringing the auxiliary wheels 52 and 54 in contact with the supporting surface. As shown in FIG. 2, such also lifts the primary supporting wheels 48 and 50 off of the surface. Therefore, at that time the entire structure is supported on the swivel wheels 24 and 26, and the two auxiliary swivel wheels 52 and 54. After the apparatus has been moved to the desired position in the workshop the bolts 62 and 64 are rotated in the opposite direction permitting the primary wheels 48 and 50 to again engage the surface. In this position the hoist is less likely to shift while working on the engine being supported by the hoist 84.

While a preferred embodiment of the invention has been described using specific terms, such description is for illustrative purposes only, and it is to be understood that changes and variations may be made without departing from the spirit or scope of the following claims.

I claim:

1. An apparatus including a hoist for lifting and transporting heavy objects on a surface comprising:

a base structure having a pair of spaced outwardly extending horizontal legs;

at least one wheel carried adjacent an inner end of said base structure for aiding in supporting said structure, a primary supporting wheel carried adjacent an outer end of each of said outwardly extending legs journaled for rotation about a fixed axis;

an auxiliary wheel carried adjacent each of said primary supporting wheels;

an adjustable means for pivotally supporting said auxiliary wheels so that said auxiliary wheels can be shifted from a first position out of contact with said surface to a second position wherein said auxiliary wheels engage said surface lifting said primary wheels out of contact with said surface;

swivel means for journaling said auxiliary wheels so that said auxiliary wheels can swivel for adding maneuverability to said apparatus when in said second position;

said adjustable means including a support member carried by an outer end of each of said legs with a portion extending outwardly beyond said legs;

means for pivotally mounting said support members relative to said outwardly extending legs;

said swivel means for journaling said auxiliary wheels being attached to an outer end of a respective support member, and means carried adjacent an inner end of said support members for selectively raising and lowering said outer ends for causing said auxiliary wheels to assume said first and second position.

2. The apparatus as set forth in claim 1, wherein said support members are channel members and wherein said means carried adjacent an inner end of said channel members include bolts, a threaded hole extending through each of said channel members adjacent said outer ends of said legs;

said bolts extending through each of said threaded holes in said channel members with an end of each of said bolts engaging one of said legs;

whereby by rotating said bolts said auxiliary wheels can be shifted between said first and second positions.

3. An apparatus for lifting an engine from an automotive vehicle and the like comprising:

a horizontal base supporting member for extending beneath said vehicle and the engine carried thereby;

a substantially vertical standard fixedly connected to and extending upwardly from said base supporting member on one end thereof remote from said vehicle;

a boom having one end pivotally attached to said vertical standard adjacent the other end thereof extending outwardly in superposed relation to said base supporting member;

a hydraulically operated cylinder pivotally connected on one end to said boom and connected on the other end in a first fixed pivotal connection to said standard and said base supporting member for raising and lowering said boom;

a hoist carried by an outer end of said boom for lifting said heavy objects;

a pair of telescoping substantially vertically adjustable safety standard members pivotally connected on an upper end to said boom;

fixed means connecting a lower end of said telescoping members in a second pivotal connection to said standard and said base supporting member;

said first and second pivotal connections being spaced and longitudinally aligned; and means for passing through said telescoping members intermediate said upper and lower ends locking said telescoping vertically adjustable safety standard members for aiding in supporting said boom in a fixed position;

whereby said base support member may be received beneath said vehicle and the engine and in the event said hydraulically operated cylinder fails said telescoping vertically adjustable safety standard members will support said boom preventing such from falling.

* * * * *